(12) United States Patent
Kondo et al.

(10) Patent No.: US 6,665,807 B1
(45) Date of Patent: Dec. 16, 2003

(54) INFORMATION PROCESSING APPARATUS

(75) Inventors: Nobukazu Kondo, Ebina (JP); Koki Noguchi, Tokyo (JP); Ikuya Kawasaki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/389,228

(22) Filed: Sep. 3, 1999

(30) Foreign Application Priority Data

Sep. 4, 1998 (JP) .......................................... 10-250710
Aug. 12, 1999 (JP) .......................................... 11-228241

(51) Int. Cl.$^7$ .............................................. G06F 1/12
(52) U.S. Cl. ...................... 713/400; 370/94; 371/471; 714/731
(58) Field of Search .......................... 370/94; 714/731; 371/47.1; 713/400

(56) References Cited

U.S. PATENT DOCUMENTS

| | | | |
|---|---|---|---|
| 4,654,654 A | * 3/1987 | Butler et al. | 340/825.5 |
| 4,873,703 A | * 10/1989 | Crandall et al. | 375/371 |
| 4,965,793 A | * 10/1990 | Polzin et al. | 370/94 |
| 5,029,124 A | 7/1991 | Leahy et al. | |
| 5,428,753 A | 6/1995 | Kondo et al. | |
| 5,768,529 A | 6/1998 | Nikel et al. | |
| 5,915,130 A | * 6/1999 | Kim | 395/888 |
| 5,919,254 A | 7/1999 | Pawlowski et al. | |
| 5,963,609 A | * 10/1999 | Huang | 375/377 |
| 6,055,285 A | * 4/2000 | Alston | 375/372 |
| 6,145,039 A | 11/2000 | Ajanovic et al. | |
| 6,336,159 B1 | 1/2002 | MacWilliams et al. | |
| 6,381,293 B1 | * 4/2002 | Lee et al. | 375/377 |

FOREIGN PATENT DOCUMENTS

JP 403058263 A * 7/1990 ....... H03K/19/0175

* cited by examiner

Primary Examiner—Thomas Lee
Assistant Examiner—N C Patel
(74) Attorney, Agent, or Firm—Antonelli, Terry, Stout & Kraus, LLP

(57) ABSTRACT

A circuit includes a transmission function of transmitting data together with a source clock synchronized to the data to another module, a reception circuit for receiving the data outputted by the module and a source clock synchronized to the data, and a synchronization circuit for connecting the circuit having a transmission function to the reception circuit are formed on a single-chip integrated circuit. Even if the module connected to the bus is changed, i.e., even if the operation clock frequency of the module of the other party is changed, other modules can be used as they are without making any change. The cost needed at the time of system construction can thus be reduced. Furthermore, as for the aspect of performance, only one synchronization circuit is needed. The increase of latency caused by synchronization can also be suppressed to the minimum.

16 Claims, 18 Drawing Sheets

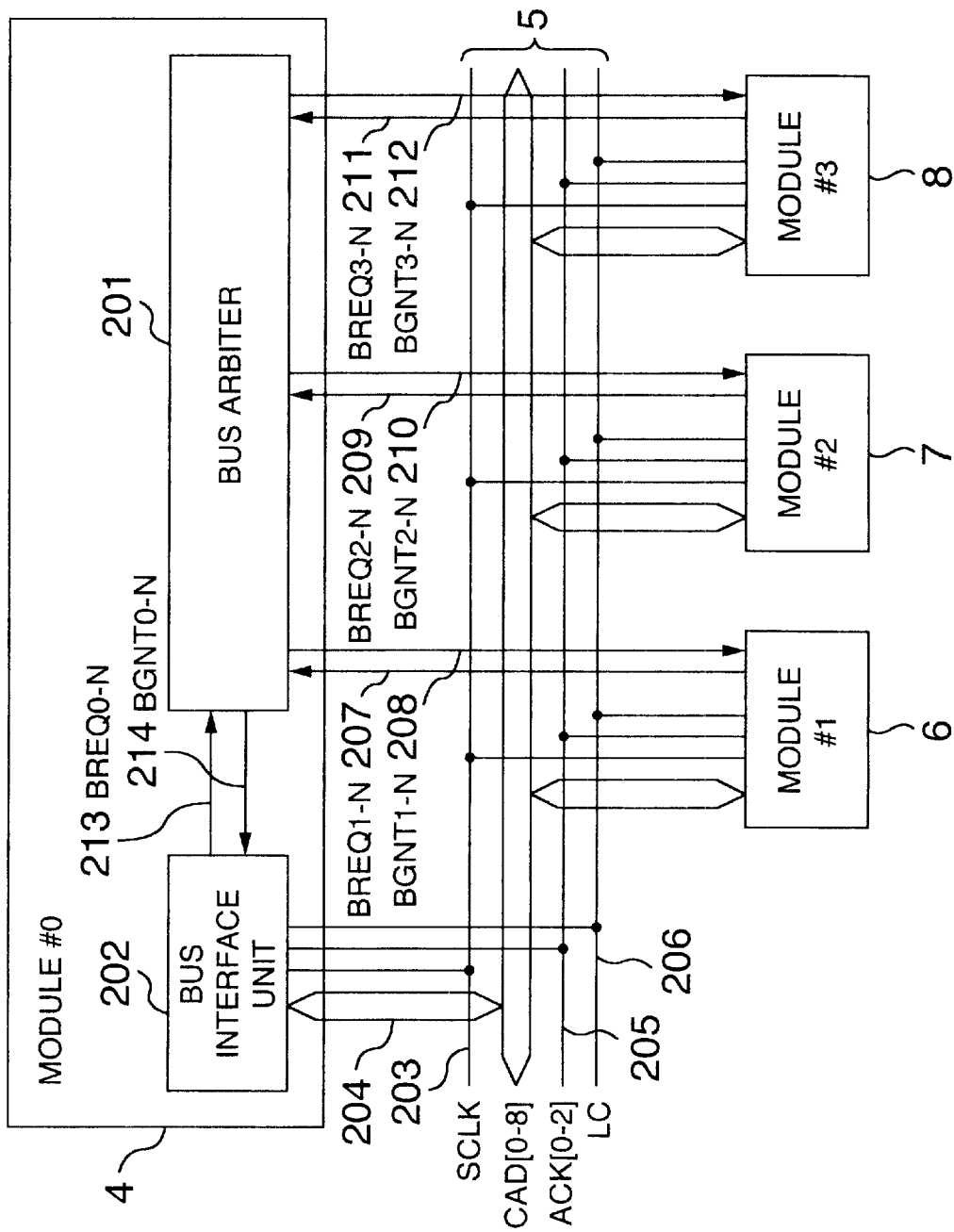

| ACK[1] | ACK[2] | MEANING |
|---|---|---|
| 0 | 0 | NO ANSWER |
| 1 | 0 | ACKNOWLEDGE |
| 0 | 1 | RETRY REQUEST |
| 1 | 1 | ERROR |

| [0-3] | | | | TRANSFER CLASS | [0-3] | | | | TRANSFER CLASS |
|---|---|---|---|---|---|---|---|---|---|
| 0 | 0 | 0 | 0 | 1 BYTE READ | 0 | 0 | 0 | 1 | 1 BYTE WRITE |
| 1 | 0 | 0 | 0 | 2 BYTE READ | 1 | 0 | 0 | 1 | 2 BYTE WRITE |
| 0 | 1 | 0 | 0 | 4 BYTE READ | 0 | 1 | 0 | 1 | 4 BYTE WRITE |
| 1 | 1 | 0 | 0 | 8 BYTE READ | 1 | 1 | 0 | 1 | 8 BYTE WRITE |
| 0 | 0 | 1 | 0 | 16 BYTE READ | 0 | 0 | 1 | 1 | 16 BYTE WRITE |
| 1 | 0 | 1 | 0 | 32 BYTE READ | 1 | 0 | 1 | 1 | 32 BYTE WRITE |
| 0 | 1 | 1 | 0 | 64 BYTE READ | 0 | 1 | 1 | 1 | 64 BYTE WRITE |
| 1 | 1 | 1 | 0 | 256 BYTE READ | 1 | 1 | 1 | 1 | 256 BYTE WRITE |

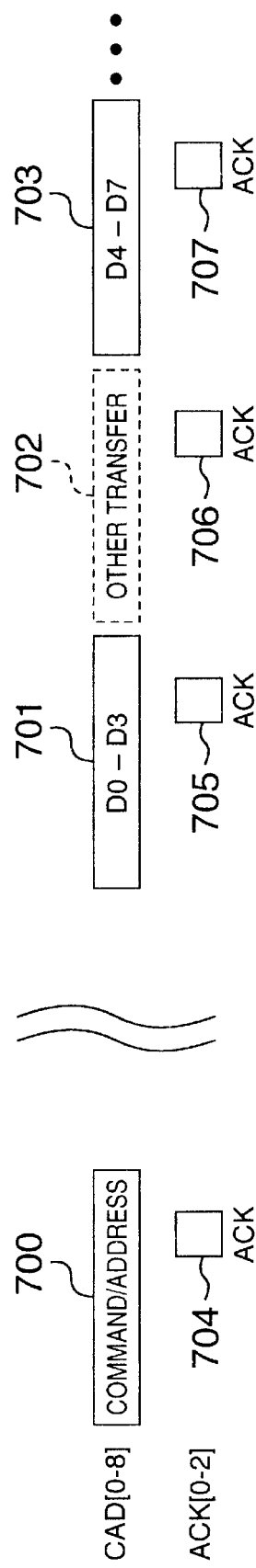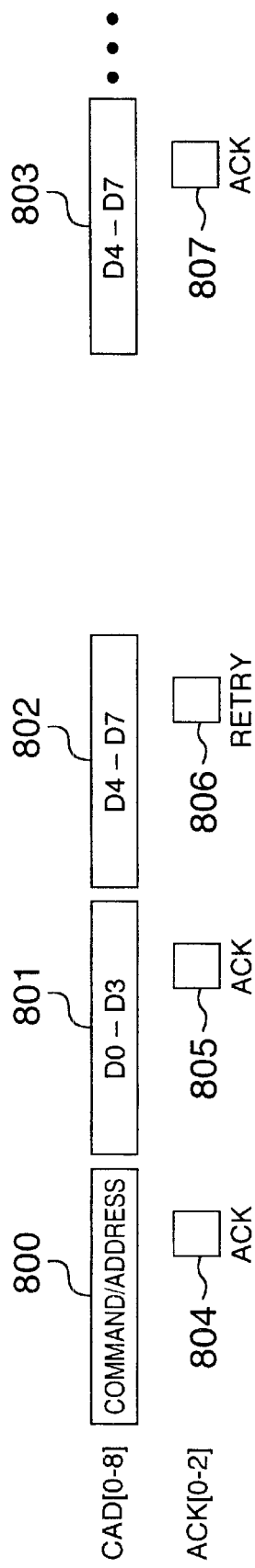

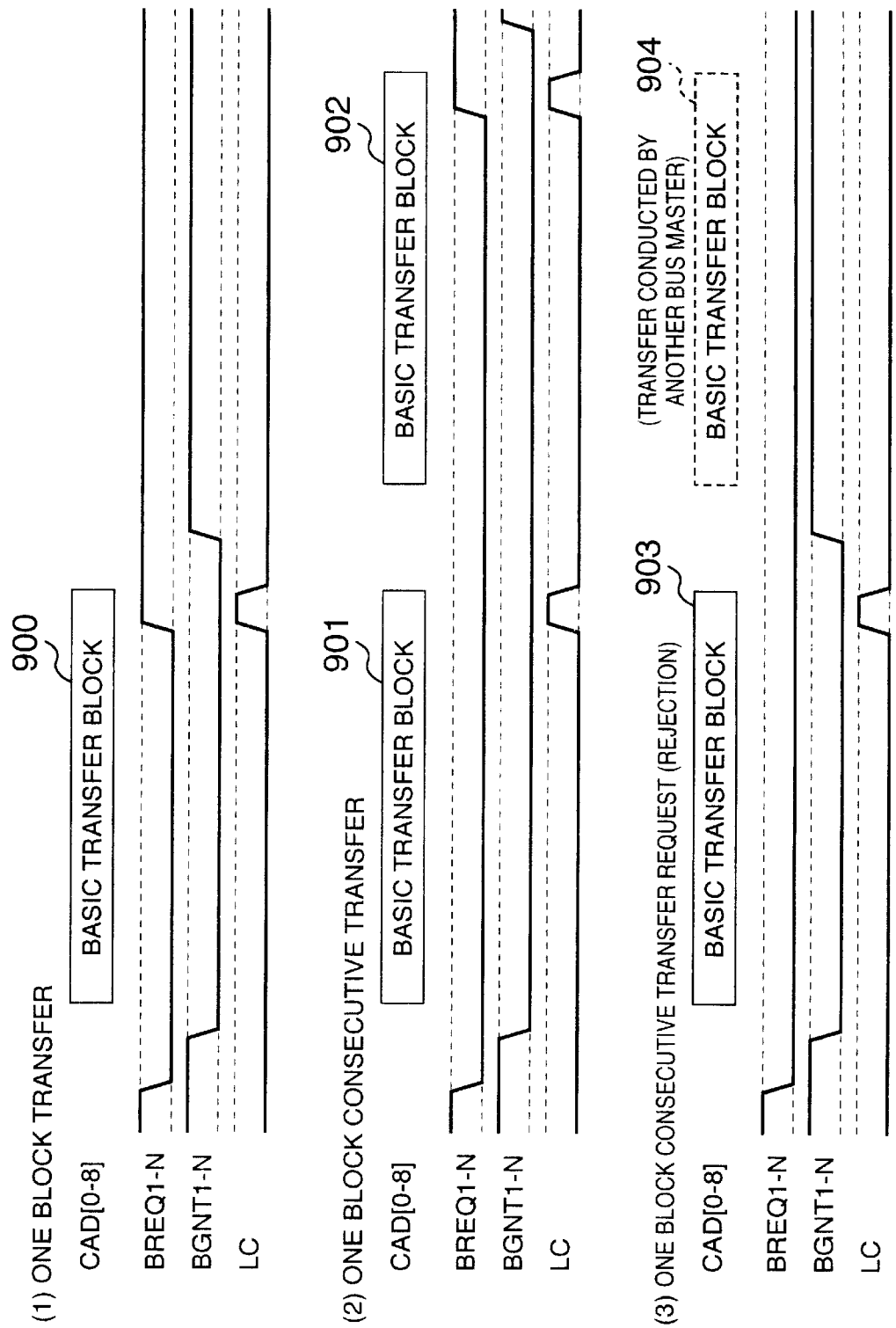

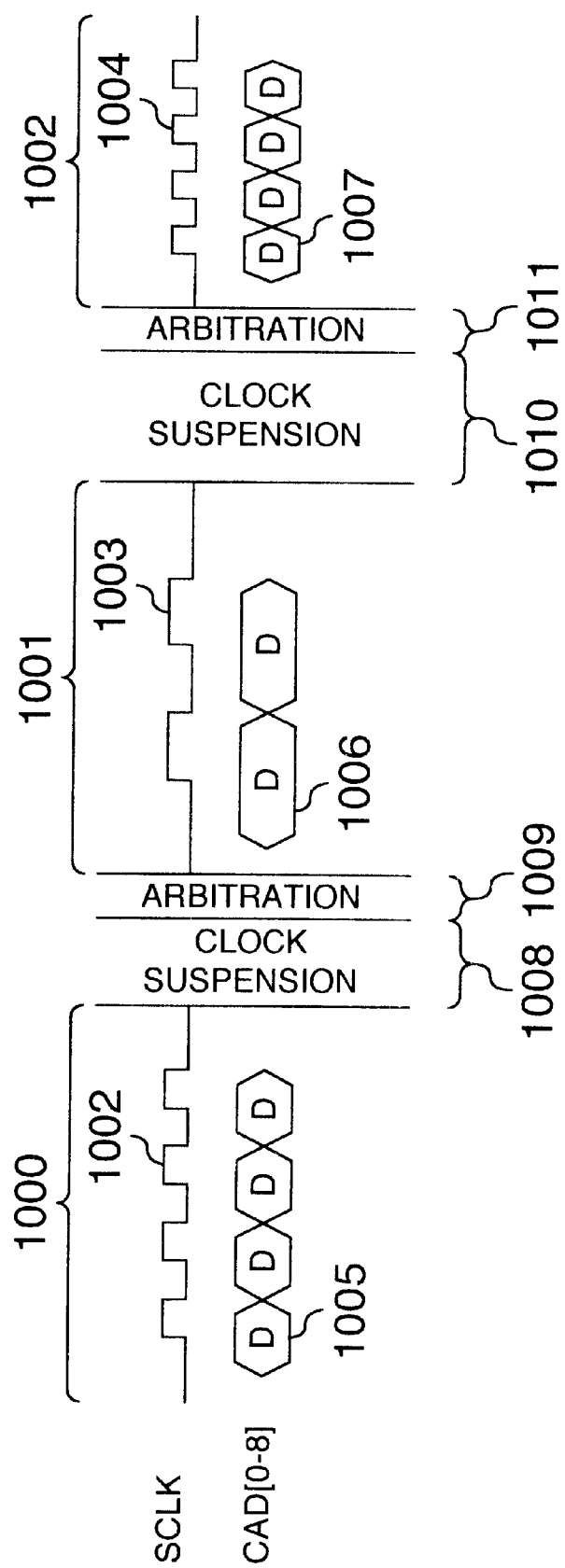

INFORMATION PROCESSING APPARATUS

CROSS-REFERENCE TO RELATED APPLICATION

This application relates to U.S. Patent Application Serial No. to be assigned based on Japanese Patent Application No. 10-250710 filed Sep. 4, 1998 entitled "INFORMATION PROCESSING APPARATUS" by N. Kondo et al., the disclosure of which is incorporated herein by reference.

BACKGROUND OF THE INVENTION

1. Field of the Invention

The present invention relates to an information processing apparatus such as personal computers and work stations, and in particular to protocols of buses of these information processing apparatuses and internal buses of LSIs used in the information processing apparatus.

2. Description of the Related Art

As for the conventional technique concerning buses used in an information processing apparatus such as personal computers and work stations, and concerning control methods of the buses, there is known a technique described in U.S. Pat. No. 5,428,753 assigned to the present assignee. As described therein, a synchronous bus has become a main stream since the design of the interface circuit is facilitated. In the synchronous bus, a plurality of modules connected to the bus conduct data transmission and reception control in synchronism with common clock timing. A typical synchronous bus configuration and its timing chart are shown in FIGS. 13 and 14, respectively. In FIG. 13, numeral 1300 denotes a clock generator for distributing a common system clock among modules, Numerals 1301, 1302 and 1303 denote modules on a bus. Numeral 1301 denotes a master module serving as a transfer source of data. Numeral 1303 denotes a slave module serving as a transfer destination of data, and numeral 1304 denotes a data bus. With reference to FIGS. 13 and 14, numerals 1400 and 1401 denote timing relations between a system clock and output data observed on an output pin of the master module 1301 serving as the transfer source of data. Numerals 1402 and 1403 denote timing relations between the system clock and input data observed on an input pin of the slave module 1303 serving as the transfer destination of data. The clocks 1400 and 1402 are distributed from the clock generator 1300 of FIG. 13 with the same phase. Data on the input pin of the slave module 1303 is delayed from that on the output pin of the master module 1301 by a propagation delay time on the data bus 1304. Since data must be transferred from the master module to the slave module in one cycle, the maximum operation frequency is typically determined on a synchronous bus by a maximum propagation delay time of the bus.

SUMMARY OF THE INVENTION

For solving this problem and further raising the frequency, a bus of a "source clock synchronous system" (or a source clock synchronous bus) is conceivable. In the "source clock synchronous system", a module serving as a transfer source transmits a latch clock to be used in a module of a transfer destination together with transfer data. A bus configuration and a timing chart of a typical source clock synchronous system are shown in FIGS. 15 and 16, respectively. In FIG. 15, numeral 1500 denotes a signal line for a source clock which is transmitted from a master module serving as a transfer source to a slave module serving as a transfer destination. With reference to FIG. 16, numerals 1600 and 1601 denote timing relations between a source clock and output data observed on an output pin of the master module serving as the transfer source of data. Numerals 1602 and 1603 denote timing relations between the source clock and input data observed on an input pin of the slave module serving as the transfer destination of data. If a source clock line and a data line are mounted on similar wiring paths in the bus of the source clock synchronous system, the source clock and the data are delayed by the same phase, and consequently failures of data acquisition are reduced. In other words, the maximum operation frequency of the bus is not reflected at the time of data propagation delay. (Because data are further delayed in a remote module, but the latch clock is also delayed by the same phase.) Typically, the bus of the source clock synchronous system is such a bus that the operation frequency can be raised easily.

However, the synchronous bus is more excellent in easiness of design. A control method of signals of an acknowledge type for each transfer cycle as described in, for example, U.S. Pat. No. 5,428,753 will now be considered. FIG. 17 shows transfer timing of the synchronous bus with a protocol of the acknowledge type. In FIG. 17, numeral 1700 denotes a system clock common to modules on the bus, numeral 1701 denotes transfer data timing, and numeral 1702 denotes acknowledge signal timing. If it is determined in the synchronous bus that a signal of the acknowledge type is issued necessarily two cycles after the data transfer cycle, association of transfer data with the report of the acknowledge type is very easy. As for the protocol of the acknowledge type, there are, for example, an acknowledge for notifying the master side that the slave side has certainly received data, a retry request for requesting the master side to retransfer data later because the slave side is not ready to receive data, and an error report for notifying the master side that data received by the slave side contained an error (such as a parity error). In the bus of the source clock synchronous system allowing data transfer at a clock frequency unique to an individual module, there is a possibility that the master side and the slave do not have the same clock system. Therefore, there is a problem that it is difficult to add a protocol of the acknowledge and the retry request.

A first object of the present invention is to provide a bus of source clock synchronous system with a protocol of an acknowledge type in order to operate the bus with high reliability and a high efficiency.

Furthermore, an information processing apparatus adopting a synchronous bus which has formed the mainstream has the following problem. Components and modules having different operation clock frequencies cannot be used mixedly. For example, if the frequency of a processor is raised, a chip set such as a companion chip must also be replaced with that having the same frequency as that of the processor. This results in a problem of an increased cost.

A second object of the present invention is to make it possible to mixedly use components and modules having different operation clock frequencies.

In order to solve the first problem, in the present invention, there is provided a source clock signal dedicated to acknowledge type signals on a signal line of a bus in order to transfer the acknowledge type signals as well by using the source clock synchronous system. Furthermore, in order to make possible control even if there are mixedly modules having different operation frequencies, an acknowledge signal is not provided for each cycle, but is provided for each basic transfer block having a substantial number of cycles. Since the acknowledge type signals are also transferred in the source clock synchronous system by using a source clock signal dedicated to the acknowledge type signals in the present invention system, a failure, on the master side, of acquisition of an acknowledge type signal from the slave side is prevented. Furthermore, since an acknowledge signal is provided for each basic transfer block having a substantial number of cycles, control becomes possible even if there are mixedly modules having different operation frequencies.

In order to solve the second problem, in the present invention, a system is constructed by providing respective modules with synchronization circuits therein so as to be able to conduct data reception and data transmission with different clocks. When transferring data in the present invention system, the latch clock to be used in the transfer destination module is transmitted by itself. Therefore, data can be transferred irrespective of the clock frequency of the transfer destination. Furthermore, when receiving data, the data can be latched uneventfully with the source clock transmitted from the transfer source. In addition, since the synchronization circuit for synchronizing data to the clock of its own module is provided in its own module, data can be received irrespective of the clock frequency of the transfer source.

In other words, in the present invention, a circuit having a transmission function of transmitting data together with a first source clock synchronized to the data to a different module, a reception circuit for receiving the data outputted by the different module and a second source clock synchronized to the data, and a synchronization circuit for connecting the circuit having a transmission function to the reception circuit are formed on a single-chip integrated circuit. Here, the first source clock is a clock of the integrated circuit (such as the companion chip), whereas the second source clock is a clock of a module such as an I/O device. The circuit having the transmission function operates according to the first source clock, whereas the reception circuit operates according to the second source clock. Furthermore, it is also possible to add terminals for outputting an acknowledge type signal or terminals for inputting an acknowledge type signal to the integrated circuit. At that time, the acknowledge type signal is inputted or outputted by using the source clock synchronous system.

Furthermore, a circuit having a transmission function of transmitting data outputted by a first module together with a source clock of the first module to a second module, a reception circuit for receiving data outputted by the second module and a source clock of the second module synchronized to the data, and a synchronization circuit for connecting the circuit having a transmission function to the reception circuit are provided on the integrated circuit. As the first module, a processor or the like is conceivable. As the second module, an I/O device or the like is conceivable. The circuit having the transmission function operates according to the source clock of the first module, whereas the reception circuit operates according to the source clock of the second module. The first module is a module which operates according to the first source clock, whereas the second module is a module which operates according to the second source clock.

Furthermore, in an information processing apparatus including a different module, an integrated circuit, and a bus for connecting the integrated circuit to the different module by using a source clock synchronous system, the integrated circuit includes a reception circuit operating according to an operation frequency of the different module, and a synchronization circuit for conducting conversion from the operation clock frequency of the different module to an operation clock frequency of its own integrated circuit, and a circuit having a transmission function and including a peripheral function module operating with the operation frequency of the integrated circuit. For the bus (integrated circuit), a protocol of the acknowledge type is adopted.

Furthermore, in an information processing apparatus including a first module, a second module, an integrated circuit, and a bus for connecting the integrated circuit to the second module by using a source clock synchronous system, the integrated circuit includes a reception circuit operating with an operation frequency of the second module, a synchronization circuit for connecting the second module to the first module, and a peripheral function module operating with an operation frequency of the first module. As the first module, a memory or the like is conceivable. As the second module, an I/O device or the like is conceivable.

Furthermore, a reception circuit portion for receiving data outputted by a transfer source module and a source clock of the transfer source module synchronized to the data, a circuit portion operating according to a clock of its own integrated circuit, and a synchronization circuit for synchronizing the data and the source clock received by the reception circuit portion to the clock of its own integrated circuit are formed on a single chip.

BRIEF DESCRIPTION OF THE DRAWING

FIG. 2 is a block diagram showing connection relations using signal lines of the bus of the present invention;

FIG. 7 is a timing chart in the case where other transfer has been inserted in a data phase of read transfer;

FIG. 8 is a timing chart in the case where retry is requested from a slave module side at the time of write transfer of the present bus;

FIG. 9 is a timing chart showing details of arbitration in the case where a bus right is moved during transfer of the present bus;

FIG. 10 is a timing chart showing transfer using three different bus masters of the present bus;

DESCRIPTION OF THE PREFERRED EMBODIMENTS

An embodiment of the present invention will now be described by referring to FIGS. 1 through 18.

Figure 1:
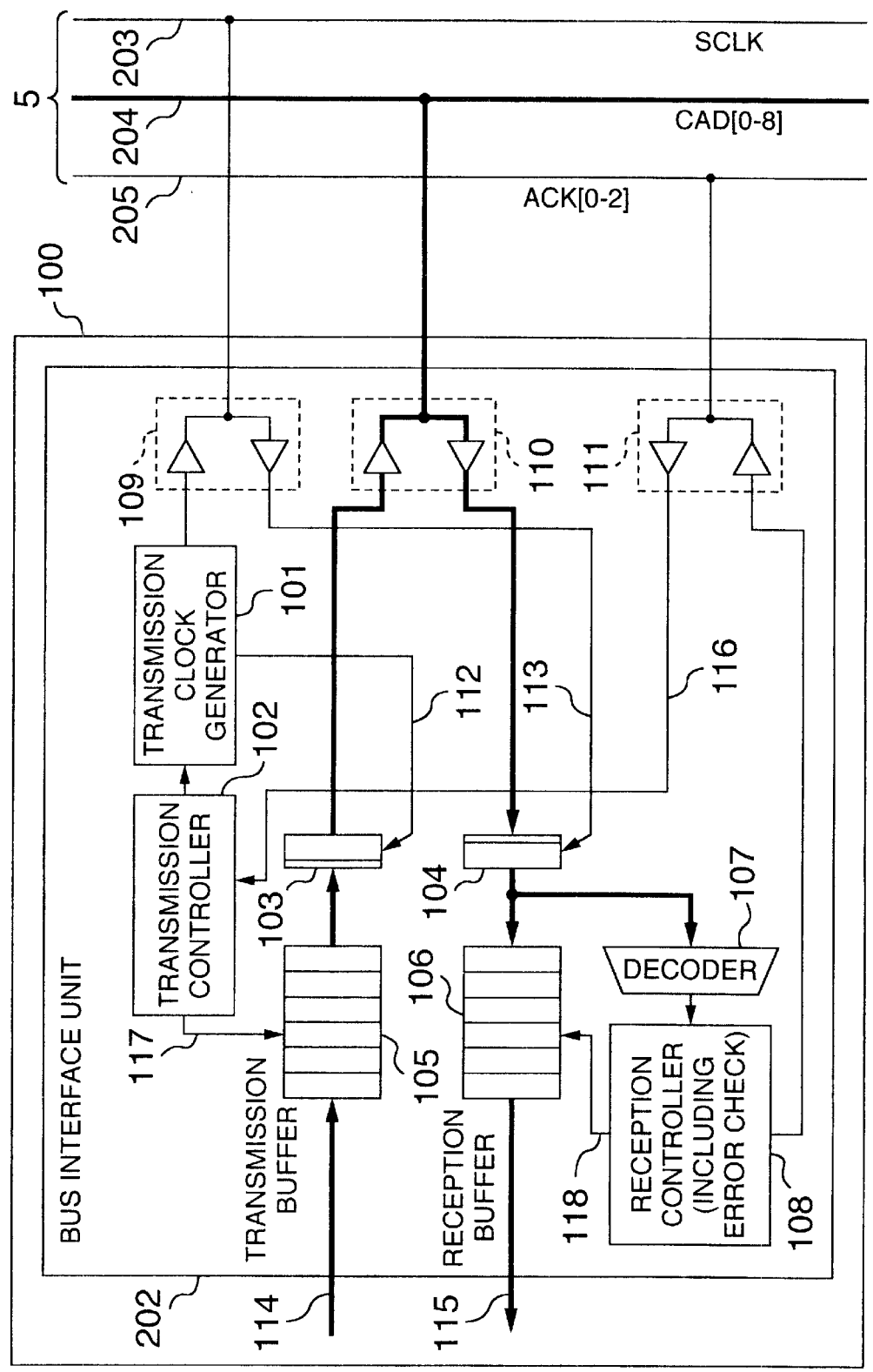
FIG. 1 is a block diagram showing an internal structure of a bus interface unit included in each of modules connected to a bus of the present invention.

In FIG. 1, numeral 100 denotes a module connected to a system bus of the present invention. Numeral 101 denotes a transmission clock generator for generating a transmission clock to be transmitted to a slave together with data. Numeral 102 denotes a transmission controller for controlling transmission timing and a transmission buffer. Numeral 103 denotes a final stage buffer for data transmission. Numeral 104 denotes an initial stage buffer for data reception. Numeral 105 denotes a transmission data buffer (including command/address/data). Numeral 106 denotes a reception data buffer (including command/address/data). Numeral 107 denotes a command/address decoder at the time of data reception. Numeral 108 denotes a reception controller for controlling the reception data buffer (including error check such as parity check of received data). Numerals 109, 110 and 111 denote bidirectional input and output buffers. Numeral 112 denotes a clock signal line for controlling timing of transmission data output. Numeral 113 denotes a latch clock signal line for reception data. Numeral 114 denotes a path of transmission data (including command/address). Numeral 115 denotes a path of reception data (including command/address). Numerals 116, 117 and 118 denote control signal lines.

In FIG. 1, the reception controller 108 corresponds to the means for transferring signals based upon the protocol of the acknowledge type. Here, the transmission controller 102 has a function of receiving the latch clock and a signal of the acknowledge type from the transfer source. The reception controller 108 has a function of transmitting a signal of the acknowledge type. To be concrete, the transmission controller 102 includes a reception controller for receiving an acknowledge type signal transmitted by the module of transmission source, an acknowledge signal detector for judging content of the acknowledge type signal, and a transmission controller for controlling the data transfer on the basis of the content of the judgment. The reception controller 108 includes an acknowledge type signal generator for generating an acknowledge type signal on the basis of a signal inputted from the decoder and information of the vacancy state of the buffer, a transmission controller for conducting synchronization to the generated acknowledge type signal, and a transmission controller for outputting such a signal ACK[0-2].

In FIG. 2, numeral 201 denotes a bus arbiter for arbitrating a bus mastership of a system bus of the present embodiment. Numeral 202 denotes a system bus interface unit of a module #0 which incorporates the bus arbiter. Numeral 203 denotes a source clock signal line of the system bus whereby a master module serving as a transfer source transmits a source clock signal simultaneously with data to a slave module serving as a transfer destination. Numeral 204 denotes multiplexed command/address/data lines of the system bus. Numeral 205 denotes acknowledge type signal lines (acknowledge, retry request, and error) of the system bus. Numeral 206 denotes a last cycle signal line for giving a previous notice that a bus master will release the bus mastership. Numeral 207 denotes a bus mastership request signal (BREQ1-N) sent from a module #1 to the bus arbiter. Numeral 208 denotes a bus use grant signal (BGNT1-N) sent from the bus arbiter to the module #1. Numeral 209 denotes a bus mastership request signal (BREQ2-N) sent from a module #2 to the bus arbiter. Numeral 210 denotes a bus use grant signal (BGNT2-N) sent from the bus arbiter to the module #2. Numeral 211 denotes a bus mastership request signal (BREQ3-N) sent from a module #3 to the bus arbiter. Numeral 212 denotes a bus use grant signal (BGNT3-N) sent from the bus arbiter to the module #3. Numeral 213 denotes a bus mastership request signal (BREQO-N) sent from a module #0 to the bus arbiter incorporated therein. Numeral 214 denotes a bus use grant signal (BGNTO-N) sent from the bus arbiter incorporated in the module #0 to the module #0.

As for signal lines of the acknowledge type in this case, there are two signal lines for transmitting data of the acknowledge type and one signal line for transferring the source clock in synchronism with the acknowledge type signal.

In FIG. 7, each of numerals 700 through 703 denotes a basic transfer block formed by collecting four data cycles as a cluster. Numeral 700 denotes a basic transfer block of a command/address phase, and each of numerals 701 through 703 denotes a basic transfer block of a data phase. Each of numerals 704 through 707 denotes timing of an acknowledge signal outputted from the slave module which has received a transferred signal. In FIG. 8, each of numerals 800 through 803 denotes a basic transfer block formed by collecting four data cycles as a cluster. Numeral 800 denotes a basic transfer-block of a command/address phase, and each of numerals 801 through 803 denotes a basic transfer block of a data phase. Each of numerals 804, 805 and 807 denotes timing of an acknowledge signal outputted from the slave module which has received a transferred signal. Numeral 806 denotes timing of a retry request signal outputted from the slave module which has received a transferred signal. In FIG. 9, each of numerals 900 through 904 denotes a basic transfer block. In FIG. 10, numerals 1000, 1001 and 1002 denote transfer signals outputted from respectively different bus masters. Numerals 1002, 1003 and 1004 denote respective source clocks. Numerals 1005, 1006 and 1007 denote respective data transfer cycles. Each of numerals 1008 and 1010 denotes an interval during which a source clock is not outputted because any module is not conducting transfer. Each of numerals 1009 and 1011 denotes an arbitration interval.

Figure 11:
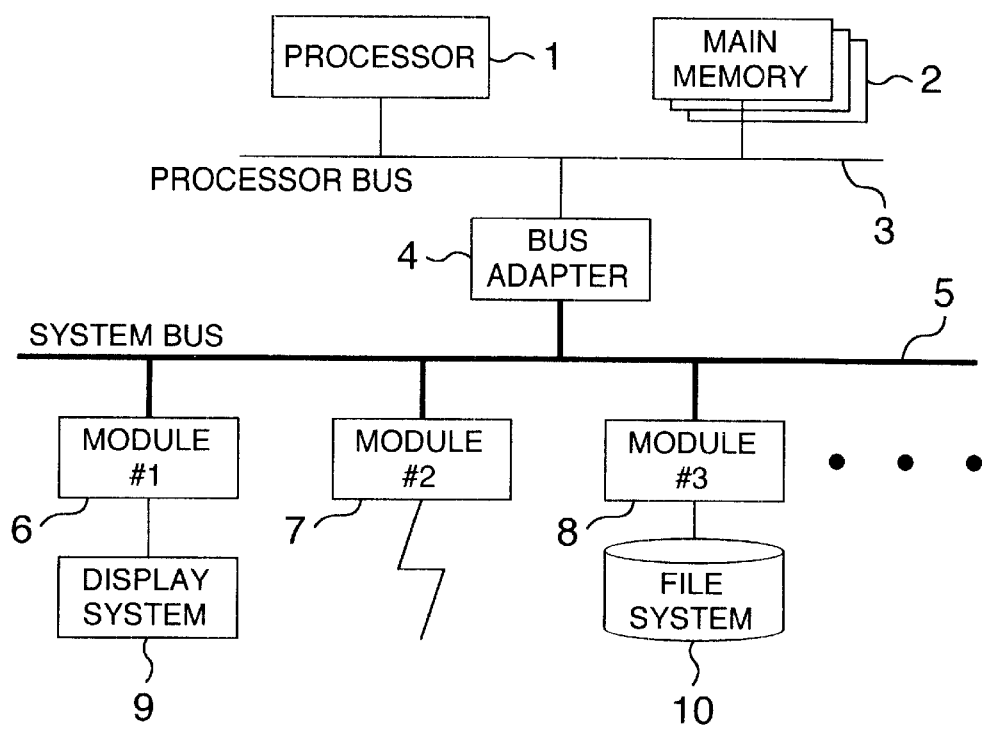
FIG. 11 is a configuration diagram of an example of an information processing system using a bus of the present invention.
Figure 12:
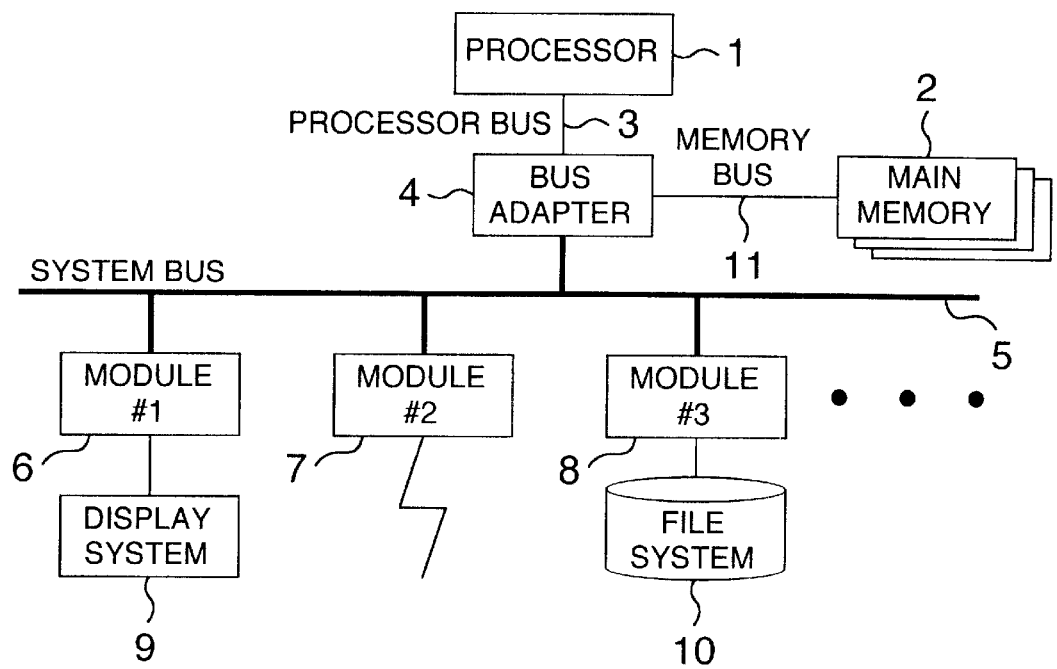
FIG. 12 is a configuration diagram of an example of an information processing system using a bus of the present invention.
Figure 13:
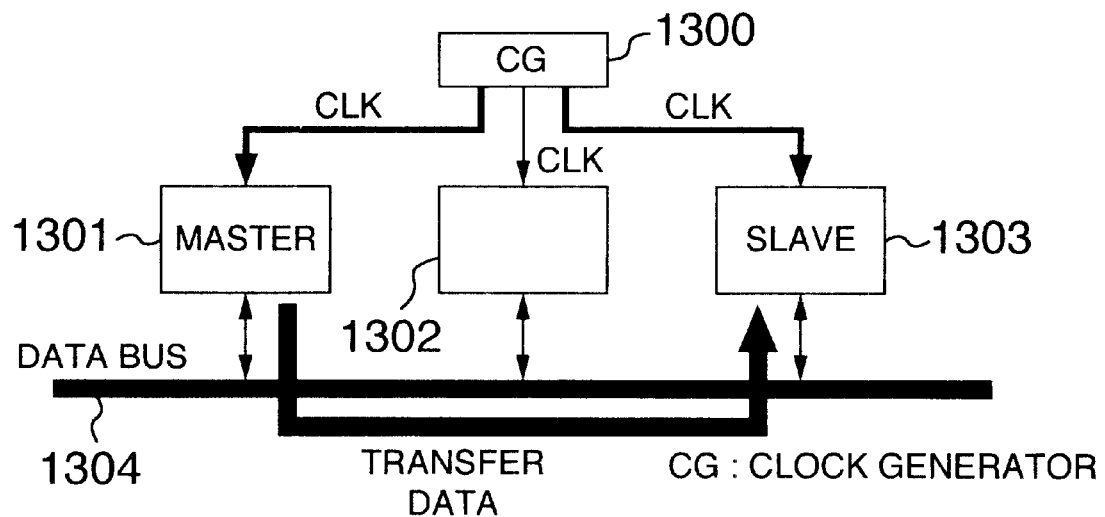
FIG. 13 is a configuration diagram showing a basic transfer system of a conventional common clock synchronous bus.
Figure 14:
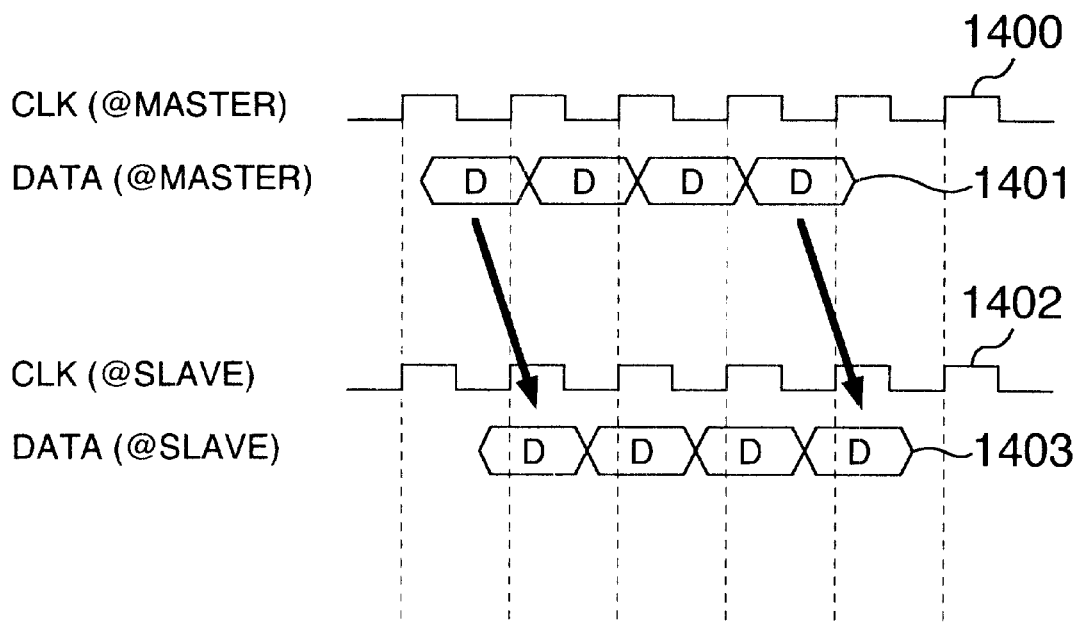
FIG. 14 is a timing chart showing a basic transfer system of a conventional common clock synchronous bus.
Figure 15:
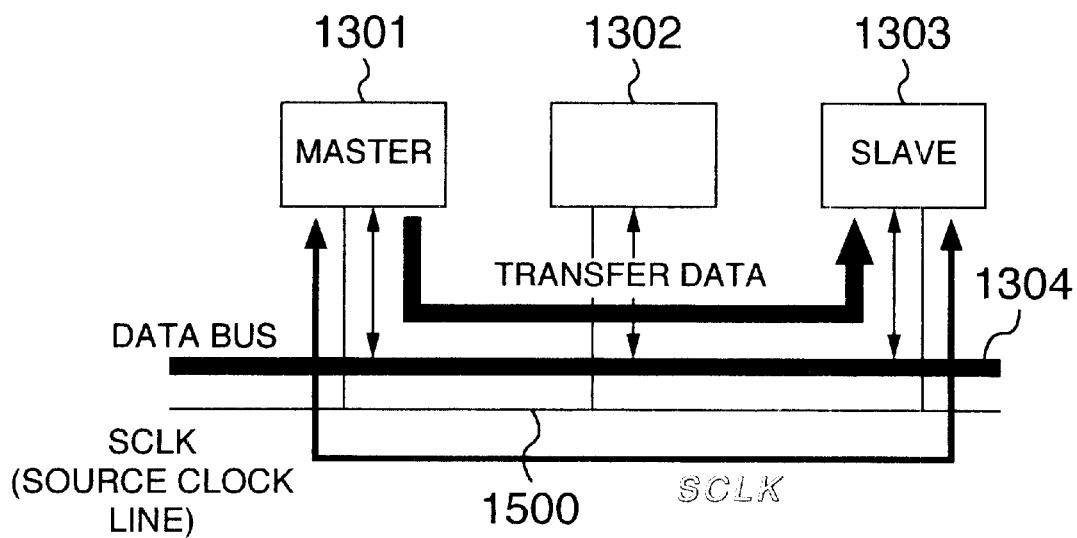
FIG. 15 is a configuration diagram showing a basic transfer system of a source clock synchronous bus.
Figure 16:
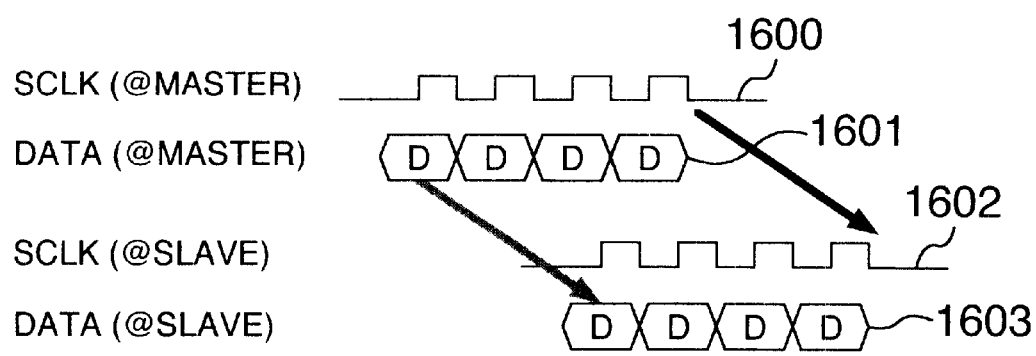
FIG. 16 is a timing chart showing a basic transfer system of a source clock synchronous bus.
Figure 17:
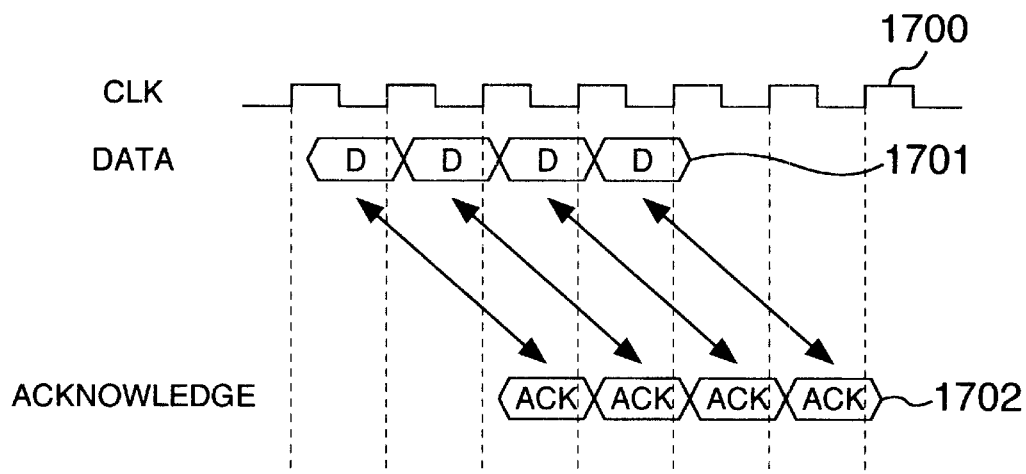
FIG. 17 is a timing chart showing a basic transfer system of a common clock synchronous bus with acknowledge.

In FIG. 11, numeral 1 denotes a processor, 2 a main memory, 3 a processor bus, 4 a bus adapter, and 5 a system bus of the present invention. Numerals 6, 7 and 8 denote modules on the system bus. Numeral 9 denotes a display system I/O (input/output) device, and numeral 10 denotes a file system I/O device. In FIG. 12, numeral 11 denotes a memory bus.

Figure 18:
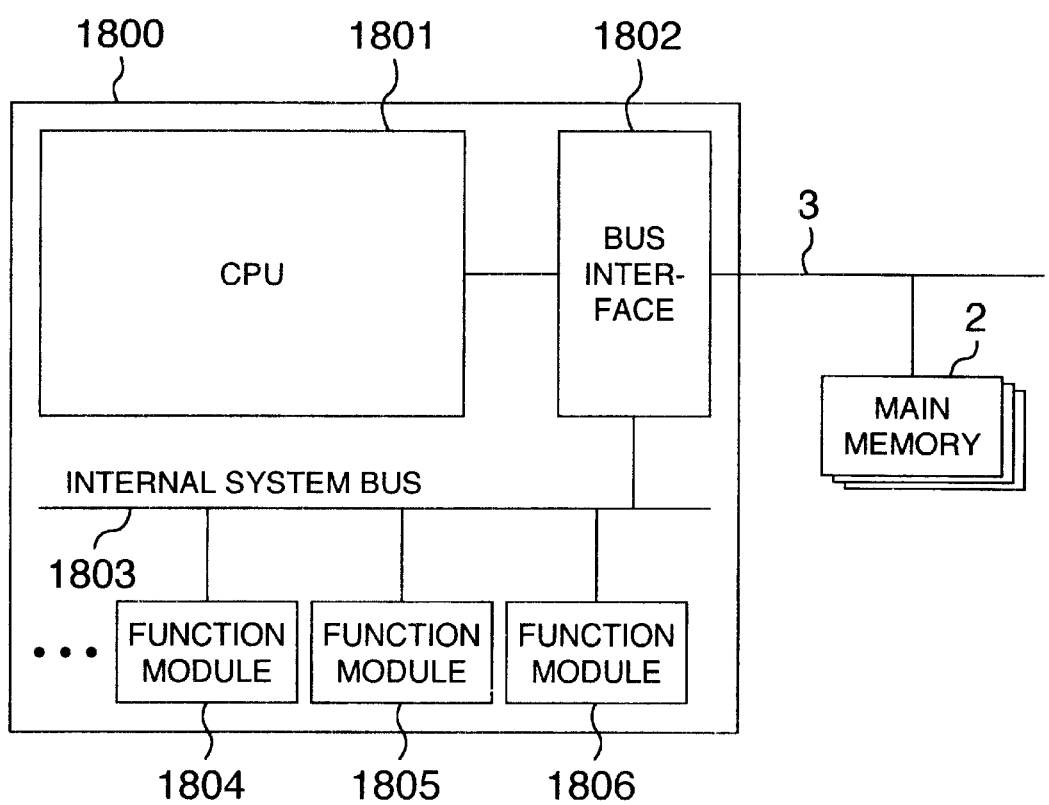
FIG. 18 is a block diagram showing a system configuration example in the case where a bus of the present invention has been applied to an internal bus of an LSI.

In FIG. 18, numeral 1800 denotes a processor obtained by integrating peripheral function modules together therewith into one chip. Numeral 1801 denotes a CPU core. Numeral 1802 denotes a bus interface for controlling an external bus and an internal system bus of the processor. Numeral 1803 denotes an internal system bus for peripheral function modules included within the processor 1800. Numerals 1804, 1805 and 1806 denote peripheral function modules incorporated in the processor 1800.

Figure 19:
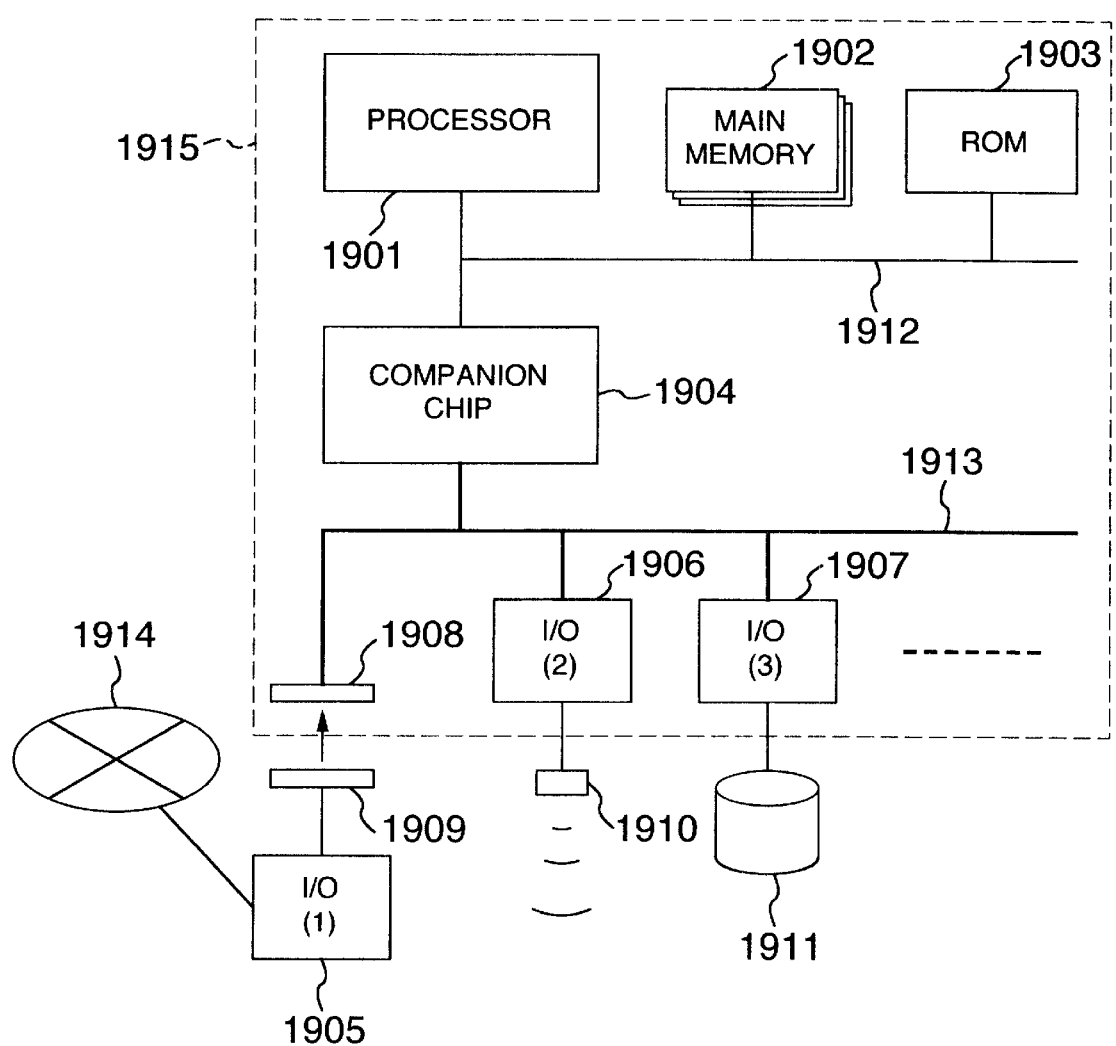
FIG. 19 is a block diagram showing an example of an information processing system using a bus of the present system.
Figure 20:
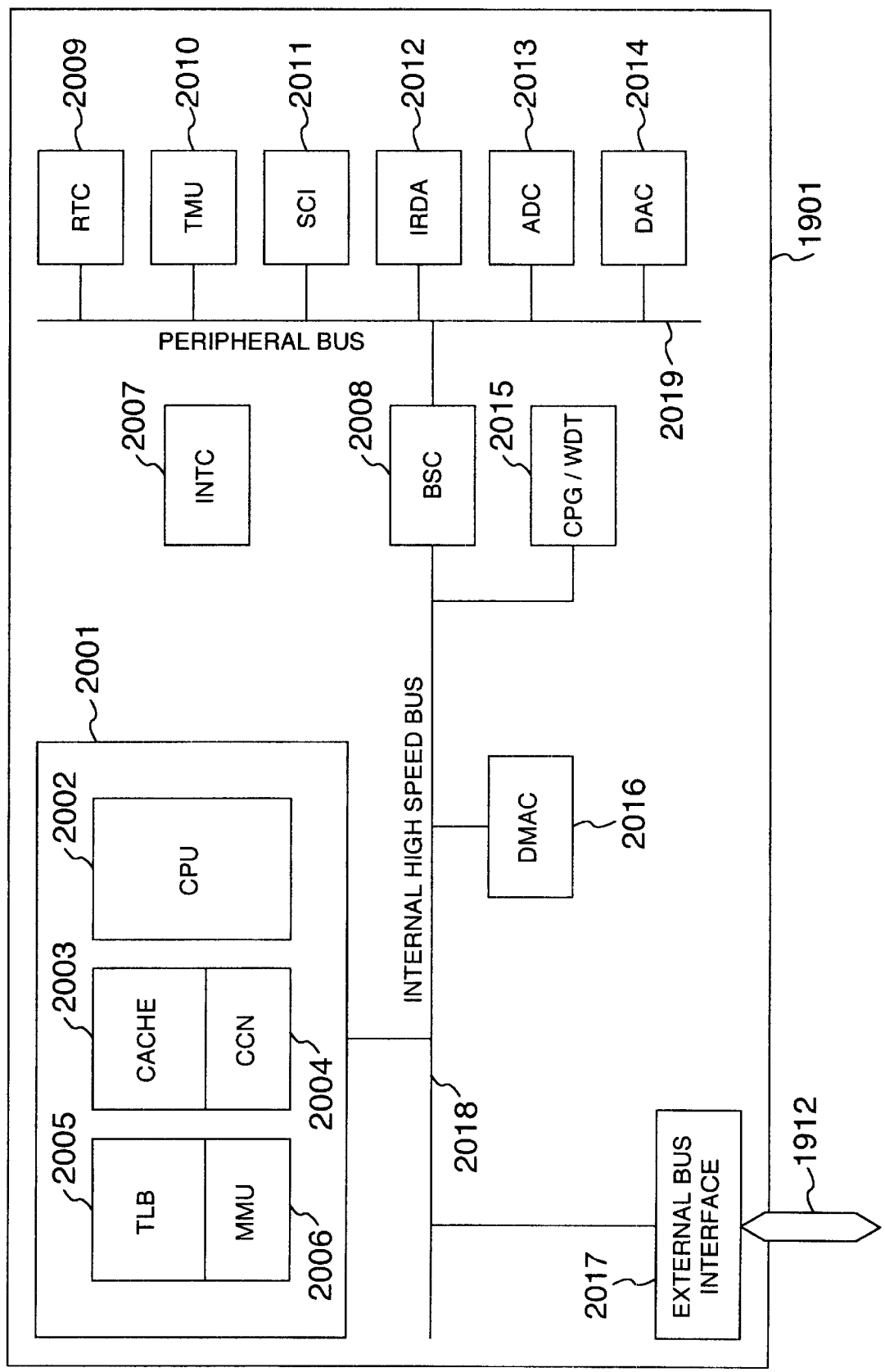
FIG. 20 is a block diagram showing an internal configuration of a processor included in the information processing system of FIG. 19.
Figure 21:
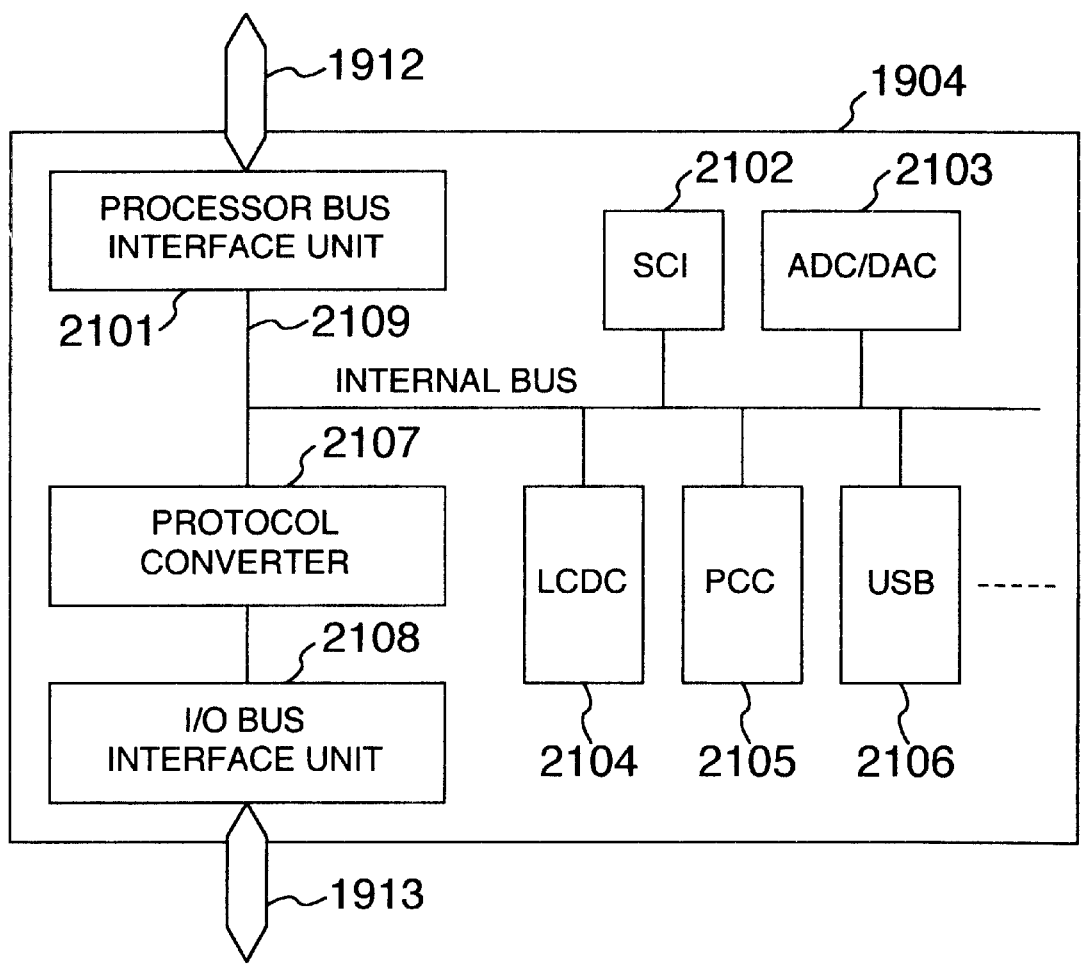
FIG. 21 is a block diagram showing an internal configuration of a companion chip included in the information processing system of FIG. 19.
Figure 22:
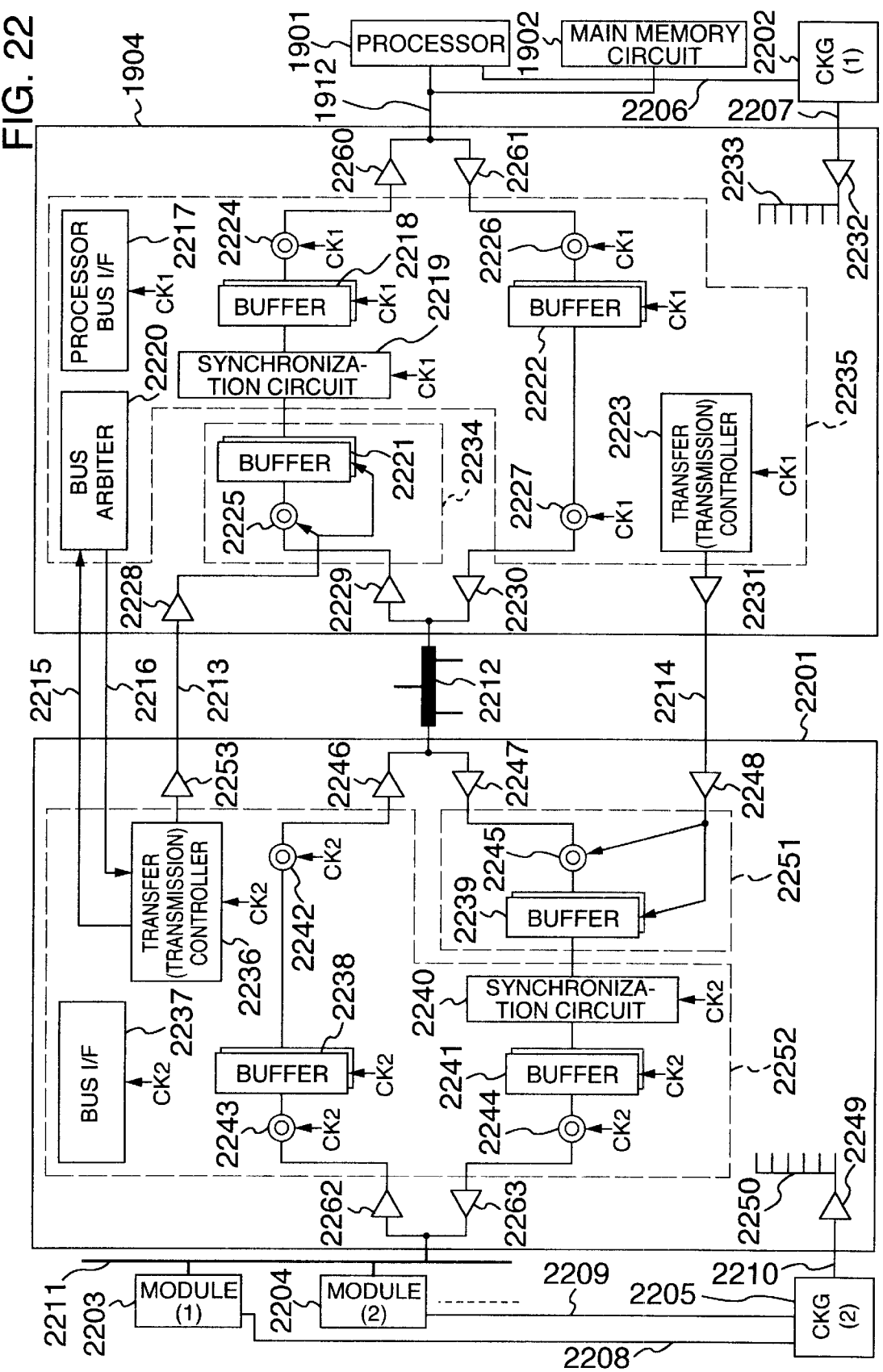
FIG. 22 is a block diagram showing a detailed structure of the information processing system of FIG. 19.
Figure 23:
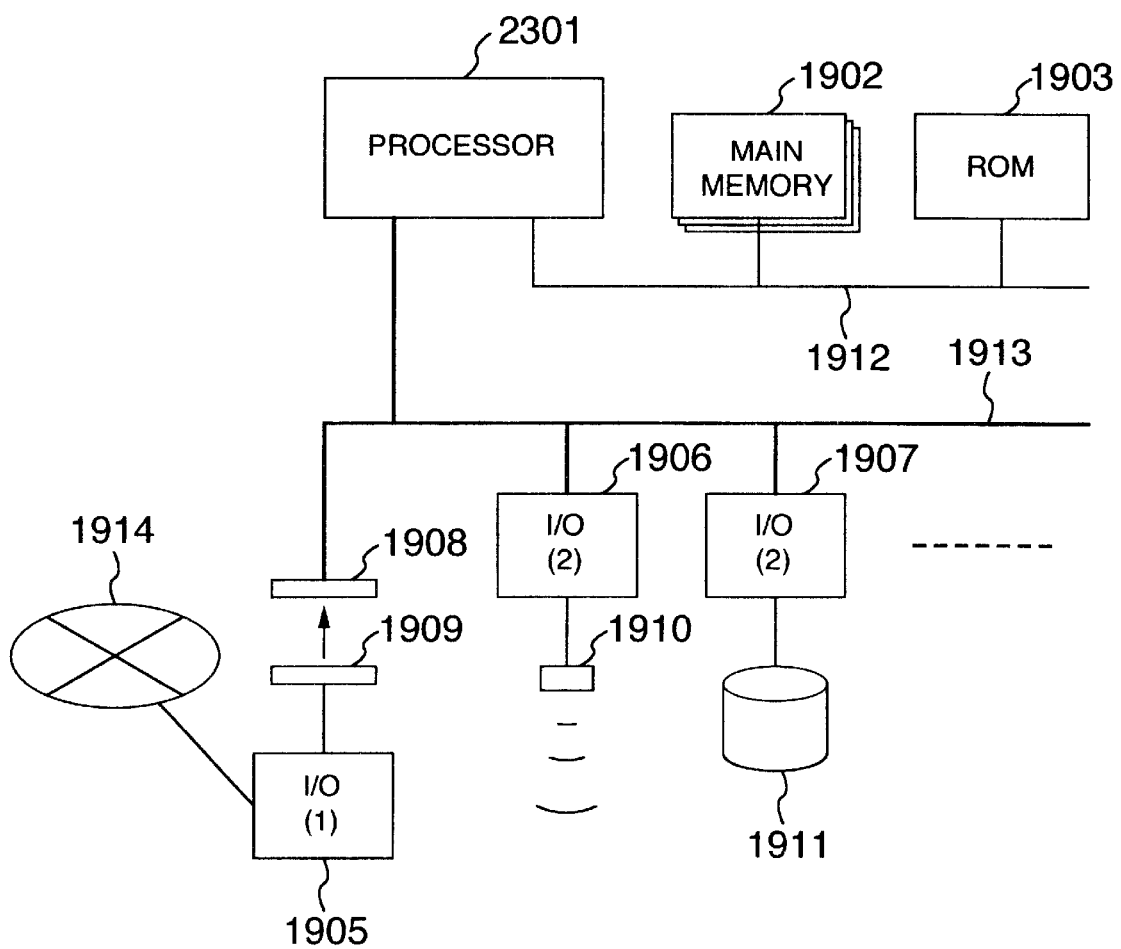
FIG. 23 is a block diagram showing an example of an information processing system using a bus of the present invention.
Figure 24:
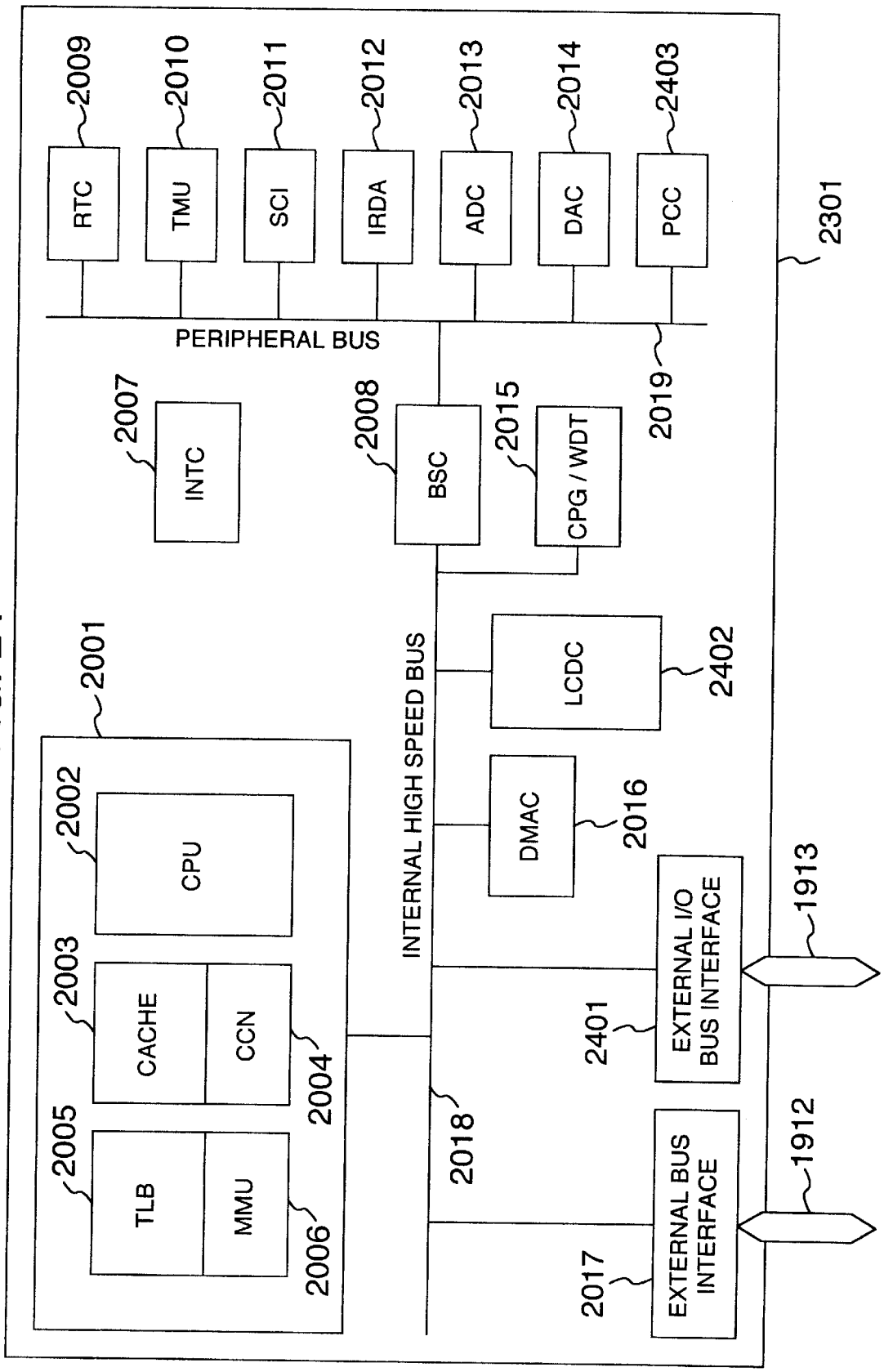
FIG. 24 is a block diagram showing an internal configuration of a processor included in the information processing system of FIG. 23.
Figure 25:
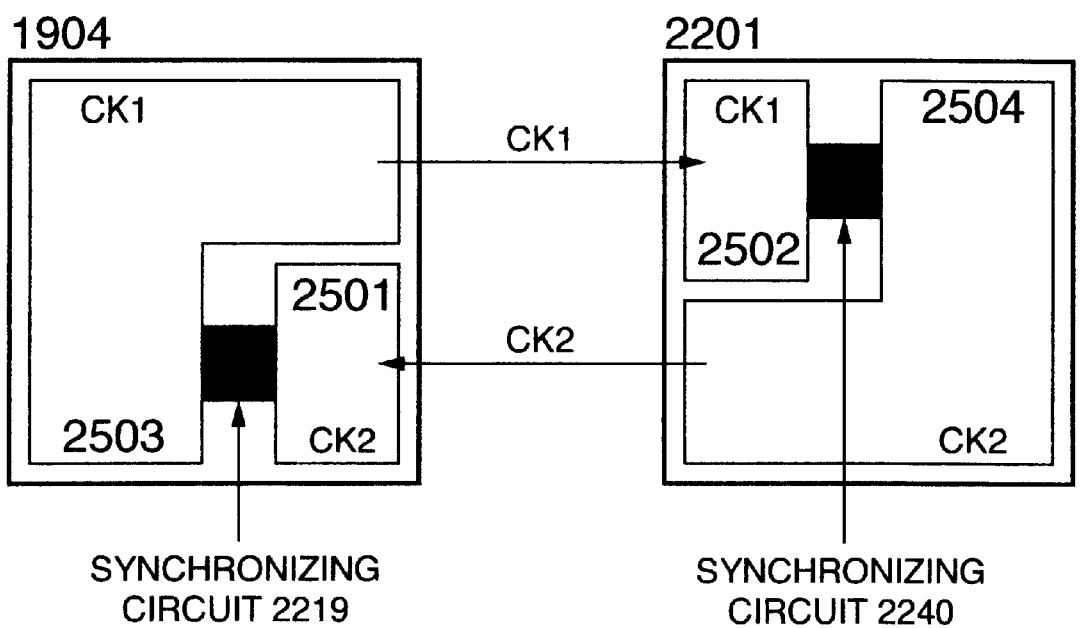
FIG. 25 is a simplified diagram showing a configuration having different operation clock frequencies on a single chip, in the detailed block diagram shown in FIG. 22.

In FIG. 19, numeral 1901 denotes a processor, 1902 a main memory, and 1903 a ROM. Numeral 1904 denotes a companion chip which is a bus adapter formed by integrating peripheral functions together. Numeral 1905 denotes an I/O device (1) having a network interface function. The I/O device (1) 1905 is a separate device having an interface such as an extension substrate or a connector. Numeral 1906 denotes an I/O device (2) having a radio communication interface function. Numeral 1907 denotes an I/O device (3) having a stored media interface. Numerals 1908 and 1909 denote connectors. Numeral 1910 denotes a radio communication antenna, 1911 a stored media device, 1912 a processor bus, 1913 an I/O bus of the present invention, and 1914 a network such as a LAN. Numeral 1915 denotes an example of the range of components mounted on a mother board (printed-circuit board) of the present information processor. In FIG. 20, numeral 2001 denotes a CPU module, 2002 a CPU core, 2003 a cache memory, 2004 a cache memory controller, 2005 a TLB (translation look aside buffer) for address translation, 2006 a MMU (memory management unit), 2007 an interrupt controller, 2008 a bus controller of an internal peripheral bus, 2009 a real time clock module, 2010 a timer unit module, 2011 a serial communication interface module, 2012 an infrared ray interface module, 2013 an AD (analog/digital) converter module, 2014 a DA (digital/analog) converter module, 2015 a clock pulse generator/watch dog timer module, 2016 a DMA control module, 2017 an external bus interface, 2018 an internal high speed bus, 2019 an internal peripheral bus. In FIG. 21, numeral 2101 denotes a processor bus interface unit, 2102 a serial communication interface module, 2103 an AD/DA converter module, 2104 a liquid crystal controller module, 2105 a PC card interface module, 2106 a USB (universal serial bus) interface module, 2107 a bus protocol converter, and 2108 an I/O bus interface unit. In FIG. 22, numeral 2201 denotes an I/O device connected to an I/O bus of the present invention. Numeral 2202 denotes a clock generator for distributing a clock to modules connected to the processor bus. Numerals 2203 and 2204 denote a module (1) and a module (2) connected to a bus 2211, respectively. Numeral 2005 denotes a clock generator for distributing a clock to modules connected to the bus 2211. Numeral 2206 denotes a clock line for supplying the clock from the clock generator 2202 to the processor 1901. Numeral 2207 denotes a clock line for supplying the clock from the clock generator 2202 to the companion chip 1904. Numerals 2208 and 2209 denote clock lines for supplying the clock from the clock generator 2205 to the module (1) and module (2), respectively. Numeral 2210 denotes a clock line for supplying the clock from the clock generator 2205 to the I/O device 2201. Numeral 2211 denotes a bus for connecting modules beyond the I/O device 2201. Numeral 2212 denotes a data line of a bus of the present invention. Numeral 2213 denotes a source clock line of the bus of the present invention. (In the present embodiment, up and down source clock lines are separated into different clock lines. The source clock line 2213 is an input to the companion chip 1904.) Numeral 2214 denotes a source clock line of the bus of the present invention. (In the present embodiment, up and down source clock lines are separated into the different clock lines. The source clock line 2214 is an output from the companion chip 1904.) Numeral 2215 denotes a bus mastership request signal sent from the I/O device 2201. Numeral 2216 denotes a bus use grant signal sent from a bus arbiter to the I/O device 2201. Numeral 2217 denotes a processor bus interface, and numeral 2218 denotes a transfer information buffer. Numeral 2219 denotes a synchronization circuit for synchronizing signals of different frequencies. Numeral 2220 denotes a bus arbiter for arbitrating a bus mastership of the I/O bus of the present invention. Numerals 2221 and 2222 denote transfer information buffers. Numeral 2223 denotes a transfer (transmission) controller. Numerals 2224, 2225, 2226 and 2227 denote flip-flops. Numeral 2228 denotes a source clock input buffer, 2229 an input buffer, 2230 an output buffer, 2231 a source clock output buffer, 2232 a clock buffer, and 2233 clock distribution wiring. Numeral 2234 denotes a range which operates according to a clock CK2 of the I/O device 2201. Numeral 2235 denotes a range which operates according to a clock CK1 of the processor bus. Numeral 2236 denotes a transfer (transmission) controller. Numeral 2237 denotes an interface of the bus 2211. Numerals 2238 and 2239 denote transfer information buffers. Numeral 2240 denotes a synchronization circuit for synchronizing signals of different frequencies. Numeral 2241 denotes a transfer information buffer. Numerals 2242, 2243, 2244 and 2245 denote flip-flops. Numeral 2246 denotes an output buffer, 2247 an input buffer, 2248 a source clock input buffer, 2249 a clock buffer, and 2250 clock distribution wiring. Numeral 2251 denotes a range which operates according to the clock CK1 of the companion chip 1904. Numeral 2252 denotes a range which operates according to the clock CK2 of the bus 2211 and the I/O device 2201. Numeral 2253 denotes a source clock output buffer, 2260 an output buffer, 2261 an input buffer, 2262 an input buffer, and 2263 an output buffer. Since FIG. 22 is a diagram showing data flow, and details of wiring of signal lines with respect to the processor bus I/F and the bus I/F having the function of the control system have no direct relation to the present invention, the details of wiring are omitted. Furthermore, numerals 2217, 2218, 2224, 2226 and 2222 in FIG. 22 correspond to the processor bus interface unit 2101 shown in FIG. 21. Numerals 2220, 2221, 2223, 2225, 2227, 2228, 2229, 2230 and 2231 in FIG. 22 correspond to the I/O bus interface unit 2108 in FIG. 21. The synchronization circuit 2219 in FIG. 22 is included in the protocol converter 2107 shown in FIG. 21. The peripheral devices such as the SCI 2102 and the LCDC 2104 shown in FIG. 21 are omitted in FIG. 22. The processor bus interface unit 2101 and the I/O bus interface unit 2108 may serve as an input circuit or an output circuit according to the sense of transfer. The clock is distributed from the clock distribution wiring 2233 to the circuit, such as the transfer controller 2223 and the buffer 2222, which operates according to CK1. In FIG. 23, numeral 2301 denotes a processor incorporating an adapter function for conducting protocol conversion to the I/O bus of the present invention. In FIG. 24, numeral 2401 denotes an external I/O bus interface, 2402 a liquid crystal controller module, 2403 a PC card interface module. In FIG. 25, numerals 2501 and 2502 denote receiving circuits, and numerals 2503 and 2504 denote circuits having a transmission function. In the companion chip 1904 shown in FIG. 22, a portion including the devices operating according to CK1, such as the processor bus I/F and the transmission controller, surrounded by a broken line is a circuit having the transmission function. A portion including the devices operating according to CK2, such as the buffer 2221, surrounded by a broken line is a receiving circuit. The SCI 2102, the ADC/DAC 2103, and the like shown in FIG. 21 are included in the circuit 2503 having the transmission function. By the way, in FIG. 22, the synchronization circuit is operating in synchronism with CK1, and consequently the synchronization circuit is included in the circuit having the transmission function.

Figures 3A, 3B, 4:
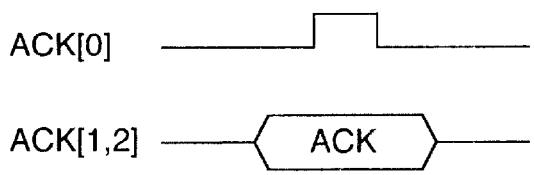
FIG. 3A is a list of meaning of acknowledge type signal lines in the bus of the present invention.
FIG. 3B is an output timing diagram of acknowledge type signals.
FIG. 4 is a command list of a multiplexed command/address/data bus of the bus of the present invention at the time of command output.
Figure 5:
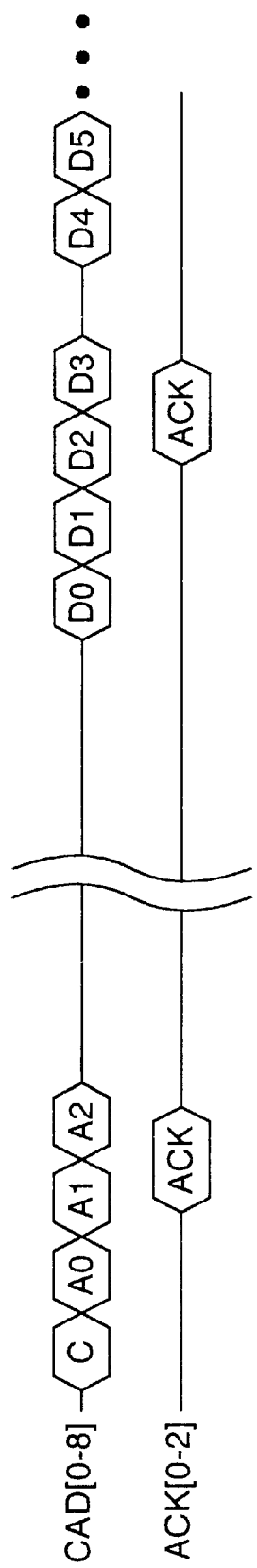
FIG. 5 is a timing chart of the present bus at the time of reading.
Figure 6:
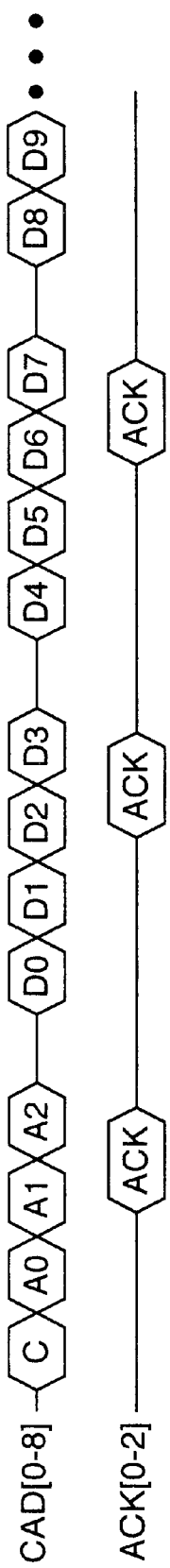
FIG. 6 is a timing chart of the present bus at the time of writing.

First of all, the system configuration will now be described. In the present embodiment, a bus protocol of the present invention has been applied to a system bus of an information processor as shown in FIG. 11 or 12. As shown in FIG. 2, signal lines of the system bus are one source clock signal line (203), nine multiplexed command/address/data lines (204), acknowledge type signal lines (205), and a last cycle signal line (206) whereby the bus master gives a previous notice that the mastership will be canceled. CAD [0-8] denotes one byte data and one parity. Basic transfer timing is shown in FIGS. 5 and 6. FIG. 5 shows read operation, and FIG. 6 shows write operation. Each of read and write operations commences with a command/address phase of four cycles. A first cycle of the command/address phase is a command cycle. Details of the command cycle are shown in FIG. 4. In the command cycle, CAD[4-7] are reserve bits. Three cycles of the command/address phase following the reserve bits are address cycles, and have a 24 bit address. As shown in FIG. 5, the read operation is conducted according to a split transfer protocol. A module which has conducted reading releases the bus mastership when the command/address phase has finished. A module which has been read acquires the bus mastership when data are ready, and starts the data cycle for the master. On the other hand, as for the write operation, a bus master module serving as a transfer source executes the data cycle subsequently to the command/address phase. Control of signals of the acknowledge type in these transfer operations is shown in FIGS. 3A and 3B. The acknowledge type signals are transmitted to the master by slave modules of respective operations by using ACK[0-2] during the interval of the basic transfer block. As shown in FIG. 3B, ACK[1, 2] denotes acknowledge data, and ACK[0] a denotes a source clock signal line whereby the master side latches the ACK[1, 2]. Furthermore, the meaning of the ACK[1, 2] is shown in FIG. 3A. A timing chart in the case where other transfer has been inserted in the data phase of read transfer is shown in FIG. 7. A timing chart in the case where a retry request is issued from the slave module side at the time of write transfer of the bus is shown in FIG. 8. In the present bus, control of the acknowledge type is conducted for each basic transfer block. In addition, arbitration can be conducted for each basic transfer block so that one module will not occupy the bus too much.

In the source clock synchronous bus, there is a possibility that there are mixedly modules having different frequencies. Even if the basic transfer blocks are fixed to four cycles, therefore, the time varies according to bus masters. As shown in FIG. 9, therefore, there is provided a last cycle (LC) which is a bus mastership release previous notice signal. As a result, arbitration of the bus by taking a basic transfer block as the unit becomes possible. It is possible to give priority to transfer having paramount urgency. It is thus considered to be suitable for handling of multimedia data as well. Finally, the internal structure of the bus interface unit common to the modules is shown in FIG. 1.

In the present invention, the signals of the acknowledge type are also transferred in the source clock synchronous system by using a source clock signal dedicated to signals of the acknowledge type. Therefore, it is prevented that the master side fails in acquiring signals of the acknowledge type from the slave side. It is possible to improve the reliability of the source clock synchronous bus and the data efficiency. Furthermore, since an acknowledge signal is provided for each basic transfer block having a substantial number of cycles, control becomes possible even if there are mixedly modules having different operation frequencies. Furthermore, since the bus clock completely stops in an interval during which transfer is not being conducted as shown in FIG. 10, it is useful to reducing power dissipation of the system as a whole.

Heretofore, application of the source clock synchronous bus to the system bus of the information processor has been described. Even if the present system is applied to an internal bus of an LSI, its effect is obtained. FIG. 18 shows an example of application thereof. There is a possibility that modules integrated together on a processor are various interfaces having frequencies different from the frequency of the processor. Therefore, the source clock synchronous bus on which modules having different clock frequencies can be mixedly present is effective.

An embodiment adopting a bus of the present invention as an I/O bus of an information processor will now be described in detail by referring to FIGS. 19 through 24. In the case where the present invention is used in an I/O bus of an information processor, there are two methods: a method of connecting via the companion chip 1904 having the protocol conversion (bus adapter) function as shown in FIG. 19, and a method of directly outputting the I/O bus of the present invention from the processor as shown in FIG. 23. First of all, the embodiment shown in FIG. 19 will now be described.

Besides memories such as the main memory and the ROM, the companion chip is connected to the processor bus in FIG. 19. The internal configuration of the processor is shown in FIG. 20, and the internal configuration of the companion chip is shown in FIG. 21. The companion chip is a component formed by integrating peripheral function modules (such as liquid crystal controller) which cannot be incorporated into the processor. In the present embodiment, it is made possible to connect the I/O bus module of the present invention by providing the bus protocol converter 2107 and the I/O bus interface unit 2108 within the companion chip. Details of the internal configuration of a bus converter of the companion chip and the device connected to the I/O bus of the present invention are shown in FIG. 22. With reference to FIG. 22, it is now assumed that data is transferred from the companion chip 1904 which is one module to the I/O device 2201 which is another module (as in PIO write from the processor to the module 2203 on the bus 2211). Here, all of the address, data, and control information signals are handled as transfer information for brevity. Transfer information such as PIO write is taken in the companion chip via the processor bus 1912, and first latched in the flip-flop 2226, then stored in the buffer 2222, finally latched in the flip-flop 2227, then sent from the output buffer 2230 to the I/O device 2201, in synchronism with CK1 which is the operation clock of the processor bus, and together with CK1. Here, all of the flip-flop 2226, the buffer 2222, and the flip-flop 2227 are operating in synchronism with CK1. In the I/O device 2201, the transfer information such as the PIO write is taken in from the input buffer 2247, first latched in the flip-flop 2245, and then stored in the buffer 2239. The flip-flop 2245 and the buffer 2239 operate in synchronism with the source clock, i.e., CK1 sent from the companion chip. Then, the transfer information outputted from the buffer 2239 is synchronized by the synchronization circuit 2240 to the clock timing of CK2 to which the I/O device 2201 and the bus 2211 are synchronized. Since then, the transfer information is sent to the module 2203 on the bus 2211 at timing synchronized to CK2. Typically in the case where an input signal and a clock have simultaneously changed in transfer between circuit blocks which do not have a common clock, an unstable state (metastable state) of a flip-flop continues sometimes. Therefore, it is necessary to latch the input signal in the flip-flop for a time enough to finish this state. This is conducted by the synchronizing circuit 2240.

On the other hand, in the case where data is transferred from the I/O device 2201 to the companion chip 1904 (as in DMA transfer from the module 2203 on 2211 to the main memory 1902), control is effected as hereafter described. Transfer information is taken in the I/O device via the bus 2211, and first latched in the flip-flop 2243. The transfer information is then stored in the buffer 2238, finally latched in the flip-flop 2242, then sent from the output buffer 2246 to the companion chip 1904, in synchronism with CK2 which is the operation clock of the I/O device 2201 and the bus 2211, and together with CK2. Here, all of the flip-flop 2243, the buffer 2238, and the flip-flop 2242 are operating in synchronism with CK2. In the companion chip 1904, the DMA write transfer information is taken in from the input buffer 2229, first latched in the flip-flop 2225, and then stored in the buffer 2221. The flip-flop 2225 and the buffer 2221 operate in synchronism with the source clock, i.e., CK2 sent from the I/O device 2201. Then, the transfer information outputted from the buffer 2221 is synchronized by the synchronization circuit 2219 to the signal of CK1 to which the processor 1912 is synchronized. Since then, the transfer information is sent to the main memory 1902 on the processor bus 1912 at timing synchronized to CK1. A sequence of control operations heretofore described is conducted. The synchronization circuit 2219 has the same function as that of the synchronization circuit 2240.

When transferring data by using the method of the present embodiment, the latch clock to be used at the transfer destination is sent by itself as heretofore described. Therefore, data can be transferred irrespective of the clock frequency of the transfer destination. Furthermore, when receiving data, the data can be latched uneventfully with the source clock transmitted from the transfer source. In addition, since the synchronization circuit for synchronizing data to the clock of its own module is provided in its own module, data can be received irrespective of the clock frequency of the transfer source. In other words, even if either the companion chip (operating according to CK1) or the I/O device (operating according to CK2) of the present embodiment operates according to a third clock frequency (CK3), it becomes possible to transfer data without causing a problem. For example, even if the frequency of the processor (and the companion chip) is raised, the I/O device can be used as it is. In other words, there is an effect that the interface components and the board can be applied to devices of a plurality of generations having different operation frequencies. (In the embodiment of FIG. 19, the range of components mounted on the board in order to make possible connection at a device level is indicated by the numeral 1915. An example capable of transferring data via the connector (1908, 1909) is shown.) In the embodiment of FIG. 22, one source clock line is provided for each transfer direction. Even if one source clock line is shared in both directions as in the embodiment of FIG. 1, however, there is no harm at all.

Furthermore, in the case where transfer from the companion chip to the I/O device is conducted, it is also possible to conduct output control on the signal of the acknowledge type according to the state of the buffer 2239 or the like. The configuration of that case can be implemented by, for example, adding the reception controller 108, the decoder 107, the bidirectional input and output buffer 111, the acknowledge type signal 205, the control signal line 116, and so on the shown in FIG. 1 to the I/O device of FIG. 22, and adding a similar configuration to the companion chip as well. This configuration brings about an effect that the reliability and data efficiency of the source clock synchronous bus can be raised in information transfer between modules having the configuration shown in FIG. 22.

If the function of the companion chip of the embodiment shown in FIG. 19 is integrated on the processor, a configuration shown in FIG. 23 is obtained. A processor obtained by integrating the I/O bus interface and various peripheral modules of the present invention together becomes as shown in FIG. 24. The transfer control is the same as that in the embodiment of FIG. 19. If a processor chip attempts to support a plurality of external bus interfaces at the same time, a pin neck is typically caused. In the source clock system bus, however, it is easy to raise the frequency. Therefore, the bus width can be narrowed by that amount. It is thus easy to dissolve the pin neck caused when a plurality of buses are supported.

In the present invention, the signals of the acknowledge type are also transferred in the source clock synchronous system by using a source clock signal dedicated to signals of the acknowledge type. Therefore, it is prevented that the master side fails in acquiring signals of the acknowledge type from the slave side. It is possible to improve the reliability of the source clock synchronous bus and the data efficiency. Such effects are obtained. Furthermore, since an acknowledge signal is provided for each basic transfer block having a substantial number of cycles, control becomes possible even if there are mixedly modules having different operation frequencies. Furthermore, since the bus clock completely stops in an interval during which transfer is not being conducted as shown in FIG. 10, there is obtained an effect that it is useful to reducing power dissipation of the system as a whole.

Even if the module connected to the bus is changed, i.e., even if the operation clock frequency of the module of the other party is changed, other modules can be used as they are without making any change. The cost needed at the time of system construction can thus be reduced. This is a further effect of the present invention. Furthermore, as for the aspect of performance, only one synchronization circuit is needed. This results in an effect that the increase of latency caused by synchronization can also be suppressed to the minimum.

What is claimed is:

1. An integrated circuit formed of a single chip, said integrated circuit comprising:

a circuit having a transmission function of transmitting data together with a first source clock synchronized to said data to a different module;

a reception circuit for receiving data outputted by said different module and a second source clock synchronized to said data;

a synchronization circuit for connecting said circuit having a transmission function to said reception circuit and synchronizing the receiving of data outputted by said different module at said second source clock to said first source clock; and an exclusive terminal for inputting and outputting an acknowledge type signal, wherein both said first and second source clocks synchronized to said data are not outputted while the data transmission is inactive.

2. An integrated circuit according to claim 1, wherein said circuit having a transmission function operates according to the first source clock, and said reception circuit operates according to the second source clock.

3. An integrated circuit according to claim 1, wherein said transmission circuit for transmitting data receives the acknowledge type signal through an exclusive line during data transfer.

4. An integrated circuit formed of a single chip, said integrated circuit comprising:

a circuit having a transmission function of receiving data outputted by a first module and transmitting the data together with a first source clock to a second module;

a reception circuit for receiving data outputted by said second module and a second source clock of said second module synchronized to the data, from said second module;

a synchronization circuit for connecting said circuit having a transmission function to said reception circuit and synchronizing the receiving of data outputted by said second module at said second source clock to said first source clock; and an exclusive terminal for inputting and outputting an acknowledge type signal, wherein said outputted first source clock is not outputted while the data transmission is inactive.

5. An integrated circuit according to claim 4, wherein said circuit having a transmission function operates according to the source clock of said first module, and said reception circuit operates according to the source clock of said second module.

6. An integrated circuit according to claim 4, wherein said transmission circuit for transmitting data receives the acknowledge type signal through an exclusive line during data transfer.

7. An integrated circuit included in an information processing system, said information processing system including a module, an integrated circuit, and a bus for connecting said integrated circuit to said module, data being transferred between said module and said integrated circuit via said bus in a source clock synchronous system, comprising:

a circuit operating according to a first source clock and having a transmission function of transmitting first data together with a first source clock to said module;

a reception circuit operating according to a second source clock and receiving second data together with said second source clock from said module;

a synchronization circuit for connecting said circuit having a transmission function to said reception circuit and synchronizing the receiving of data outputted by said module at said second source clock to said first source clock; and an exclusive terminal for inputting and outputting an acknowledge type signal, wherein said first and second source clocks are not outputted while the data transmission is inactive.

8. An integrated circuit according to claim 7, wherein a protocol of an acknowledge type is adopted to transmit and receive said first and second data.

9. An integrated circuit according to claim 8, wherein the acknowledge type signal inputted/outputted via said terminals is inputted/outputted in a source clock synchronous system, wherein said first and second source clocks are not outputted while the transmission of said acknowledge type signal is inactive.

10. An integrated circuit included in an information processing system said information processing including, said integrated circuit connected to a first module, a second module, and a bus for connecting said integrated circuit to said second module, data being transferred between said second module and said integrated circuit via said bus in a source clock synchronous system, comprising:

a circuit receiving first data outputted by said first module, operating according to a first source clock, and having a transmission function of transmitting said first data together with a first source clock to said second module;

a reception circuit operating with a second source clock and receiving second data together with said second source clock from said second module;

a synchronization circuit for connecting said circuit having a transmission function to said reception circuit and synchronizing the receiving of data outputted by said second module at said second source clock to said first source clock; and an exclusive terminal for inputting and outputting an acknowledge type signal, wherein said first and second source clocks are not outputted while the data transmission is inactive.

11. An integrated circuit according to claim 10, wherein said first module is a memory.

12. An integrated circuit according to claim 10, wherein said second module is an I/O device.

13. An integrated circuit according to claim 10, wherein a protocol of an acknowledge type is adopted to transmit and receive said first and second data.

14. An integrated circuit according to claim 13, wherein the acknowledge type signal inputted/outputted via said terminals is inputted/outputted in a source clock synchronous system, wherein said first and second source clocks are not outputted while the transmission of said acknowledge type signal is inactive.

15. An integrated circuit formed of a single chip, said integrated circuit comprising:

a reception circuit portion for receiving data outputted by a transfer source module and a first source clock of said transfer source module synchronized to said data;

a circuit portion operating according to a second source clock of said integrated circuit;

a synchronization circuit for synchronizing the receiving of said data at said first source clock as received by said reception circuit portion to said second source clock of said integrated circuit; and an exclusive terminal for inputting and outputting an acknowledge type signal, wherein said source clock is not outputted while the data transmission is inactive.

16. An integrated circuit according to claim 15, wherein said reception circuit portion operates according to said source clock of said transfer source module.

* * * * *